United States Patent [19]

Micallef et al.

[11] Patent Number: 5,472,994

[45] Date of Patent: Dec. 5, 1995

[54] MICROWAVE-HEATABLE EXERCISE PUTTY

[75] Inventors: A. M. Micallef, Aledo; Robert M. Gibbon, Fort Worth, both of Tex.

[73] Assignee: JMK International, Inc., Weatherford, Tex.

[21] Appl. No.: 376,625

[22] Filed: Jan. 23, 1995

Related U.S. Application Data

[63] Continuation of Ser. No. 41,081, Apr. 1, 1993, abandoned.

[51] Int. Cl.⁶ .................................................. C08L 85/04
[52] U.S. Cl. .................... 523/137; 524/588; 524/322; 524/857; 219/229; 607/78
[58] Field of Search .......................... 219/229; 607/78; 523/137; 524/588, 322, 857

[56] References Cited

U.S. PATENT DOCUMENTS

| | | | |
|---|---|---|---|
| 2,541,851 | 2/1951 | Wright | 260/37 |
| 2,644,805 | 7/1953 | Martin | 260/46.5 |
| 2,852,484 | 9/1958 | New | 260/33.4 |
| 3,677,997 | 7/1972 | Kaiser et al. | 260/332 |
| 3,855,171 | 12/1974 | Wegehaupt et al. | 528/10 |
| 3,862,919 | 1/1975 | Nitzsche et al. | 528/18 |
| 4,011,197 | 3/1977 | Lee | 260/46.5 R |
| 4,026,844 | 5/1977 | Kittle et al. | 260/2.5 S |
| 4,208,316 | 6/1980 | Nauroth et al. | 260/37 SB |
| 4,273,598 | 6/1981 | Nauroth et al. | 106/308 |
| 4,308,074 | 12/1981 | Nauroth et al. | 106/309 |
| 4,463,108 | 7/1984 | Wagner et al. | 523/216 |
| 5,028,653 | 7/1991 | Desmonceau et al. | 524/462 |
| 5,039,771 | 8/1991 | Morimoto et al. | 528/14 |
| 5,094,238 | 3/1992 | Gibbon | 128/403 |
| 5,319,021 | 6/1994 | Christy | 524/857 |

Primary Examiner—Melvyn I. Marquis
Assistant Examiner—Karen A. Dean
Attorney, Agent, or Firm—Jefferson Perkins

[57] ABSTRACT

A microwaveable exercise putty includes a borosiloxane or stannosiloxane reaction product. The resulting reaction product is mixed with a second polysiloxane, an internal lubricant such a monounsaturated fatty acid, and a particulate material which creates heating upon subjection to microwave energy. Precipitated silica is a particularly preferred particulate material. The exercise putty may be manipulated by patients, and at the same time is capable of delivering heat to the body part undergoing the manipulation.

13 Claims, 1 Drawing Sheet

MICROWAVE-HEATABLE EXERCISE PUTTY

This application is a continuation of application Ser. No. 08/041,081 filed Apr. 1, 1993, now abandoned.

TECHNICAL FIELD OF THE INVENTION

The present invention relates in general to therapeutic exercise putties and more particularly to exercise putty compositions suitable for heating in a microwave oven.

BACKGROUND OF THE INVENTION

Borosiloxanes exhibit peculiar physical characteristics which make them suitable for therapeutic use. These borosiloxane bouncing putties are shown, for example, in U.S. Pat. No. 2,541,851, issued to Wright, and U.S. Pat. No. 3,677,997, issued to Kaiser et al. Both of these patents are fully incorporated by reference herein.

These bouncing putties have the peculiar characteristic of being able to be kneaded and worked as a putty-like material, while at the same time exhibiting elastic properties under a greater degree of force. A borosiloxane bouncing putty has been commercially available as a toy under the trademark "SILLY PUTTY". Because of their characteristics, bouncing putties have found application in physical therapy to strengthen muscular control and performance of, e.g., patients' hands.

SUMMARY OF THE INVENTION

According to the present invention, a discovery has been made that bouncing putties can be formulated such that they will heat up rapidly in microwave ovens to temperatures suitable for delivering heat therapy to the hands or other body parts of patients, and such that they will retain their malleable qualities after heating. According to one aspect of the invention, microwaveable exercise putties comprise 100 parts by weight of a chain-extended siloxane reaction product formed by reacting a siloxane having a viscosity of 50,000–100,000 centistokes with a reactant containing oxygen and either boron or tin. A second constituent of the composition is 10–50 parts by weight of a second polysiloxane having a Williams' plasticity of 120 to 140. The second polysiloxane is non-chain extended. The composition further includes 0.2 to 2.0 parts of an internal lubricant such as a monounsaturated fatty acid, and 5 to 45 parts by weight of a particulate material susceptible to substantial heating when subjected to microwave energy. This particulate material can be selected from the group consisting of metals, metal oxides, carbon black, clays and compounds and complexes containing bound water, such as hydrated silica. Precipitated silica and clay is a particularly preferred particulate material.

According to another aspect of the invention, the above exercise putty is subjected to microwave radiation at an energy and during a period sufficient to heat up the composition to about 130° F., at which temperature the putty will feel comfortably warm to the hand. The putty may then be kneaded and manipulated by the patient to deliver a combination of manipulative and heat therapy to the affected body part.

BRIEF DESCRIPTION OF THE DRAWINGS

Further aspects of the invention and their advantages will be discerned with reference to the following detailed description in conjunction with the drawings, in which.

DETAILED DESCRIPTION OF THE DRAWINGS

Figure 1:
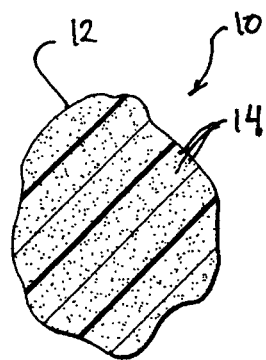
FIG. 1 is a schematic sectional view of a mass of exercise putty according to the present invention.

Microwaveable exercise putties according to the present invention include (a) a chain-extended polysiloxane reaction product, (b) a second, normal polysiloxane gum, (c) an internal lubricant such as a monounsaturated fatty acid, and (d) a particulate material which breaks up substantially when subjected to microwave energy.

The chain-extended polysiloxane reaction product is formed by reacting a polydiorganosiloxane with a reactant containing oxygen and either boron or tin. Such reactants can be any of several boron and oxygen containing reactants, such as trimethyl boroxine, pyroboric acid, boric anhydride, ethyl borate, esters of boric acid, etc. Where boron is selected as the chain-extending atom, trimethyl boroxine is a preferred reactant. The reactant may also be a tin- and oxygen-containing compound such as dibutyldiacetoxytin, or other tin and oxygen containing compound.

This reactant is reacted with a polydiorganosiloxane that preferably is a hydroxyl end-stopped polydimethylsiloxane fluid having a viscosity of 50,000–100,000 centistokes, a weight average molecular weight of 88,000–103,000, and an average number of siloxyl units per molecule in the range of 1,200–1,400. The reactant attacks the hydroxyl groups on the ends of the polysiloxane chain to yield chain extension through the boron or tin groups. Where boron is used as the chain-extending atom, and because boron is trifunctional, the boron atom will link three polysiloxane chain ends together about fifty to one hundred percent of the time.

In a particularly preferred composition, approximately 100 parts by weight of the above hydroxyl end stopped polydimethylsiloxane are reacted with approximately 3 parts by weight of trimethyl boroxine. The reaction is carried out at approximately 200° F. to produce a borosiloxane reaction product.

A second constituent of the composition is a normal polysiloxane gum having a viscosity on the order of 1,000,000 centistokes and a Williams' plasticity between 120 and 140 mm, inclusive. This second polysiloxane may be any common polydiorganosiloxane gum. While a particularly preferred second polysiloxane is polydimethylsiloxane, the percentage of side group substitutions is irrelevant, as the end composition is not to be cured and no siloxyl crosslinking will occur. Thus, a methyl vinyl polysiloxane can as easily be used. This second polysiloxane may be trimethyl end-blocked, dimethyl vinyl end-blocked, or end blocked with other alkyl groups as known in the art. The second polysiloxane is added as a plasticizer to prevent the composition from becoming tacky after extensive kneading, and may be present in the composition in the range of 10 to 50 parts by weight inclusive relative to 100 parts by weight of the chain-extended polysiloxane reaction product.

A third principal constituent of the composition is an internal lubricant such as 9-octadecenoic acid, sold commercial under the trademark PAMOLYN 125 oleic acid by Hercules Incorporated of Wilmington, Del. Other monounsaturated fatty acids such as those of $C_{17}$–$C_{18}$ carbon chain length can be used. The monounsaturated fatty acid is added to affect the flow properties of the two blended polymers described above and may be present in the end composition at 0.2–2.0 parts by weight per 100 parts of the chain-extended polysiloxane reaction product.

A fourth principal constituent is a particulate material susceptible to substantial heating when subjected to microwave energy. This material can be present in the composition from 5 to 45 parts by weight relative to 100 parts of the reaction product, and may be selected from the group consisting of metals, metal oxides, carbon black, clays, and compounds and complexes containing bound water, such as hydrated silicas. Representative of such compounds and complexes is precipitated silica, which is also particularly preferred because of its reinforcing capabilities. Precipitated silica has hydrated onto its surface a layer of water molecules. The water molecules themselves have OH bonds which absorb microwave energy; the silica particles heat upon exposure to this energy. Hydrated silicates and other compounds containing bound water are to be preferred over other water-containing mixtures because bound-water particulate materials will heat up each time after successive exposures to microwave energy. On the other hand, prior art water-containing borosiloxane compositions, such as those shown in Wright, will merely have the water constituent thereof driven off after one or two heating periods, as the water is not bound. One precipitated silica which is particularly preferred for use in the composition is sold under the trademark "Hi-Sil 250" and has a surface area of 150 $m^2$ per gram. Other siliceous filter materials (such as fumed silica) do not exhibit the same degree of microwave heating. Precipitated silica acquires its boundary layers of water by the process of its manufacture.

Precipitated silica is also a preferred microwave-active constituent in that it does not rub off on the hands as carbon black, metal and the various metal oxides have a tendency to do. This is because precipitated silica is wetted by the silicone gum and therefore is retained within the composition.

Other lubricants may be added to the composition in addition to, and not in place of, the monounsaturated fatty acid. One of these additional additives is petrolatum, which has the particular effect of imparting an anti-sticking property to the composition. Petrolatum may be present in the composition in an amount in the range of 0 to 30 parts by weight relative to 100 parts by weight of the boro- or stannosiloxane reaction product. Glycerine may also be added in the range of 0 to 1 part by weight order to impart a shiny surface to the product.

The method of the invention is disclosed more particularly with reference to FIGS. 1–5. In FIG. 1, a microwaveable exercise putty is indicated generally at 10. The microwaveable exercise putty includes a borosiloxane or stannosiloxane reaction product matrix 12, as further including a normal polysiloxane. Suspended in matrix 12 is particulate matter indicated by stippling 14. As above described, the particulate matter is preferably precipitated silica.

Figure 2:
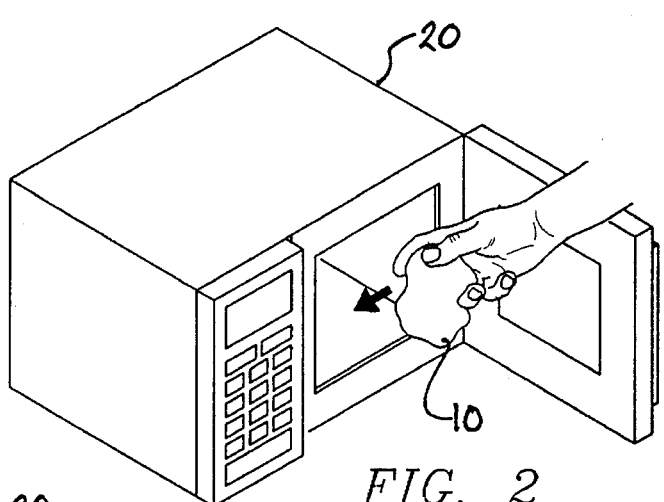
FIGS. 2–5 are isometric views illustrating steps in a therapeutic process according to the invention.

In FIG. 2, the microwaveable exercise putty 10 is being placed within a microwave oven 20. The microwave oven 20 may be of the variety used in household kitchen applications, and may have a power rating on the order of 800 watts.

Figure 3:
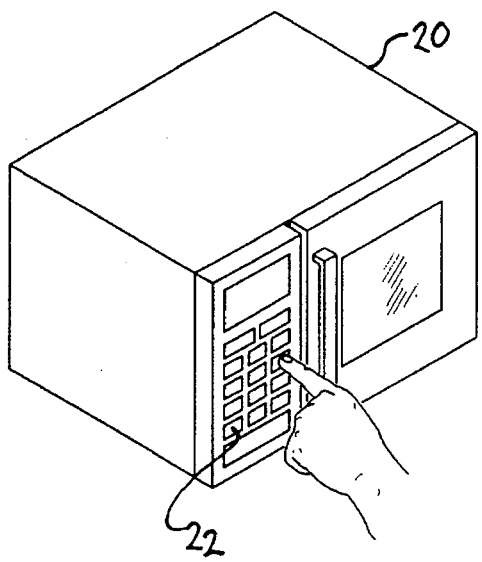

In FIG. 3, the microwaveable putty (not shown) has been placed inside the microwave oven 20. The operator selects a relatively small amount of time, such as two minutes, on a control panel 22. The microwave oven then transmits microwave energy to the putty. The bound water on the surface of the precipitated silica inside matrix 12 causes heating.

Figure 4:
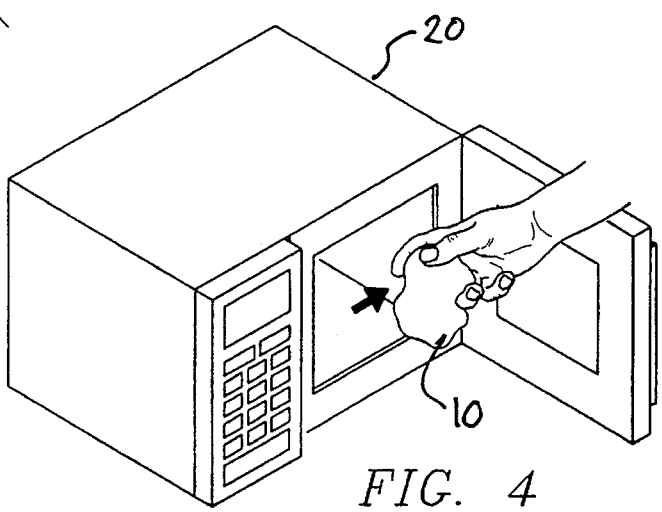
Figure 5:
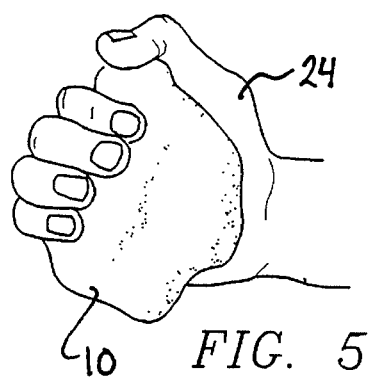

In FIG. 4, the heated microwaveable putty 10 is removed from the oven 20. After approximately two minutes of subjection to 800 watts of microwave energy, the microwaveable putty has risen to a temperature on the order of 130° F. The microwaved putty is then ready for therapeutic use, as is more particularly illustrated in FIG. 5. In FIG. 5, the microwaved putty is kneaded and manipulated by a hand 24 of the patient, who may for example, suffer from arthritis. The putty 10 combines heat therapy with general manipulative physical therapy in a novel way.

EXAMPLE I

One hundred parts by weight of a hydroxyl end-stopped polydimethylsiloxane having a viscosity of 70,000 CST were reacted with three parts by weight of trimethoxyboroxine at 200° F. until a "snow" of polymerized borosiloxane reaction product resulted. One hundred parts by weight of this reaction product was combined with 30 parts polydimethylsiloxane gum having a Williams' plasticity of 130 mm, 1 part 9-octadecenoic acid and 20 parts precipitated silica. The resultant mixture was placed in a microwave oven having an energy rating of 800 watts and subjected to microwave energy for two minutes. The resulting composition was found to be heated to approximately 130° F., which is a comfortable temperature for material to be held in the hand. The heated exercise putty was found to be suitable for use as a combination heating and flexing therapeutic tool.

EXAMPLE II

The above composition was created as before, except that 20 parts of fumed silica were used to replace the precipitated silica in the composition of Example I. A similar mass of the composition was then placed in a microwave oven for approximately two minutes. It was found that the amount of heating obtained from this second composition was much less than the first, with a temperature (of only 90° F.) being attained by the composition after this time. This second composition shows the preferential heating characteristics of precipitated silica and its bound water.

In summary, a novel microwaveable exercise putty and therapeutic method have been shown and described. However, while the detailed description has illustrated and described preferred embodiments, the present invention is not limited thereto but only by the scope and spirit of the appended claims.

We claim:

1. A microwaveable exercise putty, comprising a mixture of:

100 parts by weight of a chain-extended polysiloxane reaction product formed by reacting a polysiloxane having a viscosity of 50,000 to 100,000 centistokes with a reactant containing oxygen and either boron or tin;

10 to 50 parts by weight of an unreacted, uncured second polysiloxane having a Williams' plasticity in the range of 120 to 140 mm;

0.2 to 2.0 parts of an internal lubricant; and 5 to 45 parts by weight of a particulate material susceptible to substantial heating when subjected to microwave energy, and selected from the group consisting of metals, metal oxides, carbon black, clays and compounds and complexes containing bound water.

2. The microwaveable exercise putty of claim 1, wherein said chain extended siloxane reaction product is selected from the group consisting of borosiloxane and stannosiloxane.

3. The microwaveable exercise putty of claim 2, wherein said reactant is dibutyldiacetoxytin.

4. The microwaveable exercise putty of claim 2, wherein said reactant is trimethyl boroxine.

5. The microwaveable exercise putty of claim 1, wherein said particulate material is a hydrated silica.

6. The microwaveable exercise putty of claim 5, wherein said particulate material is a precipitated silica.

7. A microwaveable exercise putty, comprising a mixture of:
- 100 parts by weight of a borosiloxane reaction product formed by reacting a hydroxyl end-stopped, polydiorganosiloxane having a viscosity of 50,000 to 100,000 centistokes with trimethyl boroxine;
- 10 to 50 parts by weight of an unreacted, uncured second polysiloxane having Williams' plasticity of 120 to 140 mm;
- 0.2 to 2.0 parts of octadecenoic acid; and 5 to 45 parts of precipitated silica.

8. The microwaveable exercise putty of claim 7, wherein about 100 parts of said polydimethylsiloxane are reacted with about three parts by weight of said trimethyl boroxine to produce said borosiloxane reaction product.

9. The microwaveable exercise putty of claim 7, wherein said second polysiloxane consists of polydimethylsiloxane.

10. The microwaveable exercise putty of claim 9, wherein said second polysiloxane is end stopped with trimethyl or dimethyl vinyl.

11. The microwaveable exercise putty of claim 7, and further including from 0 to 1 part by weight of glycerine.

12. The microwaveable exercise putty of claim 7, and further including from 0 to 30 parts by weight of petrolatum.

13. The microwaveable exercise putty of claim 7, wherein said precipitated silica is present in the end composition at about 20 parts by weight relative to one hundred parts by weight of the borosiloxane reaction product.

* * * * *